United States Patent
Baghestani et al.

(10) Patent No.: US 12,406,213 B2
(45) Date of Patent: *Sep. 2, 2025

(54) SYSTEM AND METHOD FOR GENERATING FINANCING STRUCTURES USING CLUSTERING

(71) Applicant: Capital One Services, LLC, McLean, VA (US)

(72) Inventors: Saman Baghestani, Plano, TX (US); Rohan Shah, Frisco, TX (US); Nicholas E. Dolle, Mckinney, TX (US)

(73) Assignee: Capital One Services, LLC, McLean, VA (US)

( * ) Notice: Subject to any disclaimer, the term of this patent is extended or adjusted under 35 U.S.C. 154(b) by 11 days.

This patent is subject to a terminal disclaimer.

(21) Appl. No.: 18/092,500

(22) Filed: Jan. 3, 2023

(65) Prior Publication Data

US 2023/0136862 A1   May 4, 2023

Related U.S. Application Data (63) Continuation of application No. 15/931,095, filed on May 13, 2020, now Pat. No. 11,544,727.

(51) Int. Cl.
*G06Q 10/04* (2023.01)
*G06F 18/232* (2023.01)
(Continued)

(52) U.S. Cl.
CPC .......... *G06Q 10/04* (2013.01); *G06F 18/232* (2023.01); *G06F 18/23213* (2023.01);
(Continued)

(58) Field of Classification Search
None
See application file for complete search history.

(56) References Cited

U.S. PATENT DOCUMENTS 6,393,460 B1 * 5/2002 Gruen ................. H04L 12/1827
709/204
6,470,324 B1 * 10/2002 Brown ................. G06Q 10/087
705/28
(Continued)

FOREIGN PATENT DOCUMENTS

CA           2998274 A1 *   9/2018

OTHER PUBLICATIONS

Tribo, Joseph A, Inventories, financial structure and market structure, International Journal of Production Economics. 71 1-3, 79-89, May 6, 2001 https://www.sciencedirect.com/science/article/pii/S0925527300001079.*

(Continued)

*Primary Examiner* — Octavian Rotaru
(74) *Attorney, Agent, or Firm* — Sterne, Kessler, Goldstein & Fox P.L.L.C.

(57) ABSTRACT

Described herein is a system for generating financing structures. A learning engine may extract data sets associated with sellers of various products. The learning engine may be trained using the data sets. The learning engine may identify a subset of dimensions that cause a change in a determination of a final price for a given product. The learning engine may compute a value for each of the sellers with respect to each dimension. The learning engine may group the sellers into different clusters. The learning engine may generate using a model, including the subset of dimensions. The learning engine may receive a request to generate a financing structure for a specified product sold by a specified seller. The learning engine may generate financing structures for the specified product sold by the specified seller based on the generated model.

15 Claims, 8 Drawing Sheets

(51) Int. Cl.
*G06F 18/23213* (2023.01)
*G06N 20/00* (2019.01)
*G06Q 30/0201* (2023.01)

(52) U.S. Cl.
CPC ......... *G06N 20/00* (2019.01); *G06Q 30/0201* (2013.01); *G06Q 30/0206* (2013.01)

(56) References Cited

U.S. PATENT DOCUMENTS

| | | | | |
|---|---|---|---|---|
| 8,630,879 B1* | 1/2014 | Hendrix | ................ | G06Q 40/12 705/30 |
| 10,255,245 B1 | 4/2019 | Crable | | |
| 10,366,435 B2 | 7/2019 | Swinson | | |
| 11,544,727 B2 | 1/2023 | Baghestani et al. | | |
| 2001/0025264 A1* | 9/2001 | Deaddio | ................ | G06Q 40/03 705/36 R |
| 2002/0184140 A1* | 12/2002 | Quaile | ................ | G06Q 40/08 705/38 |
| 2003/0014345 A1* | 1/2003 | Lim | ................ | G06Q 40/06 705/36 R |
| 2003/0041019 A1* | 2/2003 | Vagim, III | ............. | B82Y 15/00 705/38 |
| 2003/0083972 A1* | 5/2003 | Williams | ................ | G06Q 40/04 705/36 R |
| 2003/0236733 A1* | 12/2003 | Weeks | ................ | G06Q 40/02 705/37 |
| 2004/0073444 A1* | 4/2004 | Peh | ................ | G06Q 40/00 707/999.107 |
| 2004/0177033 A1* | 9/2004 | Weeks | ................ | G06Q 40/00 705/38 |
| 2005/0004795 A1* | 1/2005 | Printz | ................ | G10L 17/00 704/E15.045 |
| 2005/0086187 A1 | 4/2005 | Grosser et al. | | |
| 2006/0015421 A1* | 1/2006 | Grimberg | ............... | G06Q 40/00 705/35 |
| 2007/0022037 A1* | 1/2007 | Pechenik | ............... | G06Q 40/06 705/37 |
| 2007/0244777 A1* | 10/2007 | Torre | ................ | G06Q 40/00 705/35 |
| 2008/0046383 A1 | 2/2008 | Hirtenstein et al. | | |
| 2008/0059372 A1* | 3/2008 | Lee | ................ | G06Q 20/105 705/41 |
| 2008/0103946 A1 | 5/2008 | Johnson et al. | | |
| 2008/0183616 A1* | 7/2008 | Hankey | ................ | G06Q 40/02 705/38 |
| 2008/0306812 A1* | 12/2008 | Bowen | ............ | G06Q 10/06398 705/7.42 |
| 2009/0037346 A1* | 2/2009 | MacPherson | .......... | G06Q 40/06 705/36 R |
| 2010/0023357 A1 | 1/2010 | Walker et al. | | |
| 2010/0153198 A1 | 6/2010 | Murphy et al. | | |
| 2011/0022599 A1* | 1/2011 | Chidlovskii | ........ | G06F 16/3347 707/E17.046 |
| 2011/0082759 A1* | 4/2011 | Swinson | ................ | G06Q 30/02 705/26.1 |
| 2011/0161197 A1* | 6/2011 | Noy | ................ | G06Q 30/0205 705/347 |
| 2012/0095896 A1* | 4/2012 | Aston | ................ | G06Q 40/04 705/37 |
| 2012/0124049 A1* | 5/2012 | Akiyama | ............... | G06Q 30/02 707/E17.089 |
| 2012/0226594 A1* | 9/2012 | Hirani | ................ | G06Q 40/04 705/37 |
| 2012/0254184 A1* | 10/2012 | Choudhary | ............ | G06Q 50/01 707/738 |
| 2012/0284113 A1 | 11/2012 | Pollak | | |
| 2012/0284204 A1* | 11/2012 | Mathews | ............... | G06Q 40/08 705/36 R |
| 2012/0303474 A1* | 11/2012 | Sanel | ................ | G06Q 30/08 705/26.4 |
| 2014/0013204 A1* | 1/2014 | Theis | ................ | G06F 16/84 715/255 |
| 2014/0278805 A1* | 9/2014 | Thompson | ......... | G06Q 30/0283 705/7.35 |
| 2015/0025993 A1* | 1/2015 | Kiglies | ................ | G06F 3/048 705/26.3 |
| 2015/0106174 A1 | 4/2015 | Gill | | |
| 2015/0120489 A1* | 4/2015 | Edelman | ............ | G06Q 30/0639 705/26.4 |
| 2016/0117743 A1* | 4/2016 | Joshi | ................ | G06Q 40/03 705/26.4 |
| 2016/0232471 A1* | 8/2016 | Inman | ............... | G06Q 10/06393 |
| 2017/0032400 A1* | 2/2017 | Gilmore | ............ | G06Q 30/0206 |
| 2017/0270580 A1* | 9/2017 | Esposito | ............ | G06Q 30/0613 |
| 2017/0278125 A1* | 9/2017 | Tietzen | ................ | G06Q 30/0229 |
| 2018/0096437 A1* | 4/2018 | Sun | ................ | G06F 16/29 |
| 2018/0121942 A1* | 5/2018 | Vlassis | ................ | G06Q 30/0204 |
| 2018/0189812 A1* | 7/2018 | Swinson | ............ | G06Q 30/0205 |
| 2018/0189868 A1 | 7/2018 | Guinovart | | |
| 2018/0204281 A1* | 7/2018 | Painter | ............... | G06Q 30/0641 |
| 2018/0330417 A1 | 11/2018 | Wollmer et al. | | |
| 2019/0043071 A1* | 2/2019 | O'Keeffe | ............ | G06Q 30/0601 |
| 2019/0114705 A1 | 4/2019 | Wong et al. | | |
| 2019/0122278 A1 | 4/2019 | Wollmer et al. | | |
| 2019/0172001 A1 | 6/2019 | Painter et al. | | |
| 2019/0172132 A1* | 6/2019 | Bruner | ................ | G06Q 40/04 |
| 2020/0082822 A1* | 3/2020 | Kneller | ................ | G06N 20/00 |
| 2021/0110466 A1* | 4/2021 | Zhukov | ................ | G06Q 20/12 |
| 2021/0241227 A1* | 8/2021 | Ma | ................ | G06F 16/285 |
| 2021/0303319 A1* | 9/2021 | Hamze | ................ | G06F 8/20 |
| 2021/0390600 A1* | 12/2021 | Norman | ................ | G06F 21/31 |

OTHER PUBLICATIONS

International Search Report and Written Opinion of the International Searching Authority directed to related International Patent Application No. PCT/US21/60798, mailed Feb. 4, 2022; 18 pages.
Tribo, Joseph A., Inventories, financial structure and market structure, International Journal of Production Economics, 71 1-3, 79-89, May 6, 2001, https://www.sciencedirect.com/science/articled/pii/S0925527300001079 (Year: 2001).

* cited by examiner

SYSTEM AND METHOD FOR GENERATING FINANCING STRUCTURES USING CLUSTERING

BACKGROUND

Different entities such as car dealerships, home builders, real estate agents, retail stores interface with different financial intuitions for financing a product for sale. The product may be automobiles, houses, appliances, furniture, and/or the like. Each of these entities may operate differently and may have different methodologies to determine a final sales price for a particular product.

Determining a financing structure without understanding an entity's needs may be a slow and error-prone process. The financial institution may not generate financing structures that best fit the entity even after multiple iterations. Transmitting multiple requests and receiving multiple financing structures may be computationally expensive and create a network bottleneck.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Described herein is a system for generating financing structures. A learning engine may extract data sets associated with sellers of various products. Each data set may be associated with a dimension used for generating a financing structure. The learning engine may be trained using the data sets. The learning engine may identify a subset of dimensions that cause a change in a determination of a final price for a given product for more than a threshold amount of sellers and which cause a change in the determination of the final price more than a threshold amount. The learning engine may compute a value for each of the sellers with respect to each dimension of the subset of dimensions. The learning engine may group the sellers into different clusters. Each cluster may include a subset of sellers having a value for a given dimension within a predetermined amount of each other. The learning engine may be generated using a model including the subset of dimensions.

The learning engine may receive a request to generate a financing structure for a specified product sold by a specified seller. The learning engine may generate financing structures for the specified product sold by the specified seller based on a generated model and an identified price of the specified product set by the specified seller. The learning engine may use a machine-learning algorithm to generate financing structures for the specified product sold by the specified seller. The machine learning algorithm may be an unsupervised machine learning algorithm, such as K-means clustering.

The system provides a financing structure that may be predicted to be acceptable to the particular seller for a given product while meeting lender credit decisioning requirements and buyer preferences. This way, the seller and buyer are presented with financing structures that are specifically geared to effectively moving the parties to agreement on the financing structure enabling the product to be purchased given the pricing structure of the product. In this regard, the system solves the technical problem of transmitting multiple requests for generating financing structures and receiving each of the financing structures. In this configuration, the system reduces the amount of computer resources required and avoids potential network bottleneck.

Figure 1:
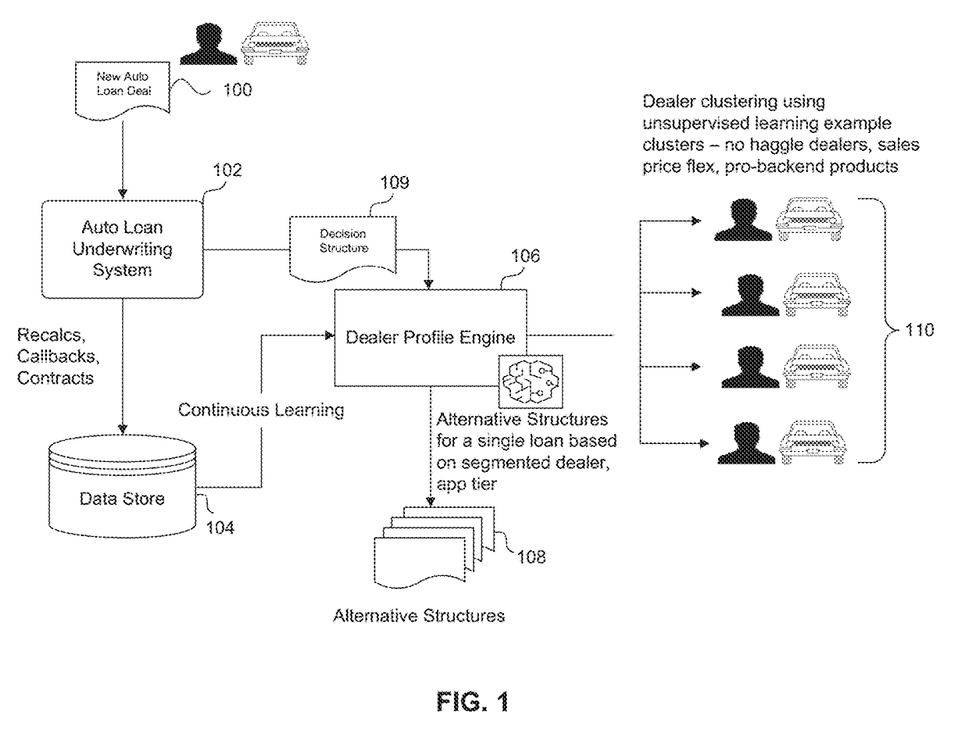
FIG. 1 is a block diagram illustrating data flow for a system for generating financing structures according to some embodiments.

FIG. 1 is a block diagram illustrating data flow for a system for generating financing structures according to some embodiments. In operation 100, a seller (e.g., automobile dealership) of a specified product (e.g., an automobile) may interface with a financial institution to generate a financing deal for purchasing the specified product.

In operation 102, the financing deal may go through an underwriting process. For example, the financial institution may underwrite the financing for purchasing the specified product. The underwriting process may generate a decision structure 109 for the financing deal. The decision structure may govern the rules of determining a final financing structure. For example, multiple different attributes may be factored into determining the final financing structure. The multiple different attributes may include the final sale price of the specified product, the breakdown of the sale price, the amount of down payment being provided, details related to the product (e.g., condition of the product, whether the product is new or used, type of product, and/or the like), and/or the like. The decision structure may vary for each financial institution and seller.

The financing structure details may be stored in a data store 104, after the underwriting process. The data store 104 may store information such as the financing structure details (e.g., APR, total amount financed, time period of the loan, customer details, credit score of the customer, and/or the like). Data store 104 may also store information such as recalculations, callbacks, and contracts. Recalculations may be different calculations executed to arrive at the final financing structure. Callbacks may be counter offers offered by the financial institutions to arrive at the final financing structure. For example, a financial institution may approve a customer for certain financing offers; however, may not approve the customer for a specific financing structure. In this situation, the financial institution may present a counteroffer to the specific financing structure that was not approved by the financial institution. The financing structure may include a combination of the type of product and specific structure aspects (sales price, back end products, trade-in value if present, cash down, etc.). A financial institution may present counteroffers, including different financing structures, until the parties come to an agreement on the final financing structure. In this regard, the financing structure is optimized for the customer and seller. Data store 104 may store information related to financing structures generated for different sellers 110 of different products.

A dealer profile engine 106 may continuously receive the information stored in data store 104 as well as any financing structure after the underwriting processing, including generated decision structure 109. Dealer profile engine 106 may be trained using the data received from data store 104 and generated decision structures 109. Dealer profile engine 106 may group various sellers into different clusters 110 based on the data received from data store 104 and generated decision structures 109.

Dealer profile engine 106 may determine which attributes impact the determination of the final financing structure for more than a threshold amount of sellers 110. Furthermore, dealer profile engine 106 may determine which attributes impact the final financing structure more than a threshold amount. Dealer profile engine 106 may then compute a value for each seller for each attribute, based on the data received from data store 104 and generated decision structures 109. Dealer profile engine 106 may group sellers 110 into clusters based on their value for each attribute. For example, a cluster may include sellers 110 with values for a given attribute within a threshold amount. Dealer profile engine 106 may generate a model such as a multi-dimensional graph. Each dimension of the multi-dimensional graph may correspond with an attribute determined to impact the determination of the final financing structure for more than a threshold amount of sellers 110 and impact the final financing structure more than a threshold amount. Dealer profile engine 106 may position the clusters on the multi-dimensional graph. Dealer profile engine 106 generates alternative financing structures 108 based on the position of the cluster(s), including the seller, on the multi-dimensional graph. The multi-dimensional graph will be described in greater detail with respect to FIG. 2.

The alternative financing structures 108 generated by the dealer profile engine 106 are generated based on a predictive model that may anticipate and facilitate an agreement between the customer and seller on an alternative financing structure 108.

Figure 2:
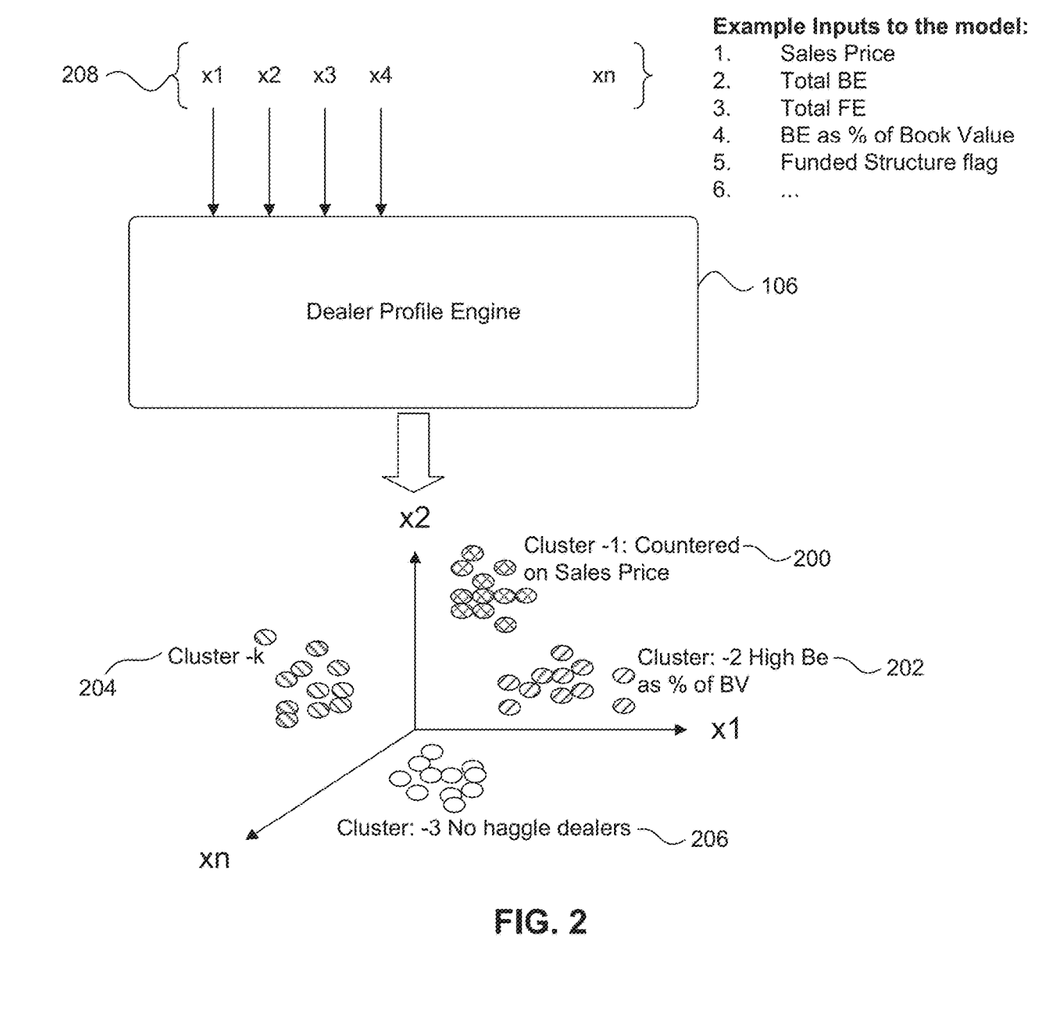
FIG. 2 is a block diagram illustrating clusters positioned on a multi-dimensional graph according to some embodiments.

FIG. 2 is a block diagram illustrating clusters positioned on a multi-dimensional graph according to some embodiments. Dealer profile engine 106 may receive various sets of data 208. As stated above, dealer profile engine 106 may receive decision structures for generating financing structures and data from the data store. The data of the decision structures and the data from the data store may be included in sets of data 208. Sets of data 208 may include a sales price, backend value of the sales price, frontend value of the sales price, percentage of the sales price that is the backend value as compared to the total value of the product, funded structured flag, and/or the like. Dealer profile engine 106 may be continuously trained using sets of data 208. The funded structured flag may indicate whether the seller prefers protection for assuming the credit risk.

As described with respect to FIG. 1, dealer profile engine 106 may determine which attributes impact the determination of the final financing structure for more than a threshold amount of sellers and which attributes impact the final financing structure more than a threshold amount, resulting in a subset of attributes. Dealer profile engine 106 may generate a dimension for each attribute in the subset of attributes, resulting in a subset of dimensions.

Dealer profile engine 106 may then compute a value for each seller for each dimension. Dealer profile engine 106 may group sellers into clusters based on their value for each attribute. Dealer profile engine 106 may generate a model such as a multi-dimensional graph 210. Each dimension, x1, x2, xn, of multi-dimensional graph 210, may correspond with a different attribute. Dealer profile engine 106 may position clusters 200-206 on the multi-dimensional graph based on the values of each of the sellers for a given attribute.

As a non-limiting example, cluster 200 may include sellers which presented counter offers of the sales price more often than other sellers (e.g., countered on sales price). The dimension x2 may correspond with the frequency of counteroffers presented by sellers. Accordingly, dealer profile engine 106 may compute a higher value for dimension x2 for cluster 200 than clusters 202-206. Dealer profile engine 106 may position sellers in cluster 200 with respect to their values with respect to dimension x1, x2, and xn.

As another non-limiting example, cluster 202 may include sellers which presented offers with a sales price including a higher percentage of backend value as compared to total price of the product, compared to sellers in clusters 200, 204, 206 (e.g., high BE as a % of book value (BV)). Dimension x1 may correspond to a percentage of backend value as compared to a total price of the product. Accordingly, dealer profile engine 106 may compute a higher value for dimension x1 for sellers in cluster 202 than clusters 200, 204, 206. Dealer profile engine 106 may position sellers in cluster 202 with respect to their values with respect to dimension x1, x2, and xn.

As another non-limiting example, cluster 206 may include sellers who did not bargain on the sales price of the product (e.g., no-haggle dealers). Accordingly, as dimension x2 corresponds with the frequency of counteroffers presented by sellers, dealer profile engine 106 may compute a lower value for dimension x2 for cluster 204 than clusters 200, 202, 206. Dealer profile engine 106 may position sellers in cluster 204 with respect to their values with respect to dimension x1, x2, and xn.

Each cluster may be identified by an attribute. For example, cluster 200 may be identified as Cluster-1: Countered on Sales Price; cluster 202 may be identified as Cluster-2: High BE as a percentage of book value (BV); cluster 206 may be identified as Cluster-3: no-haggle dealers; and cluster 204 may be identified as cluster-k: k attribute.

In an embodiment, attributes can also include behavioral tendencies of various sellers. Attributes may include percentages of vehicles of a given make and model, seasonal variability, amount of time a product has been on sale, financial bonuses or goals of the seller, and/or the like. As an example, an automobile dealership may sell more of a vehicle of a given type of make and model as they may have more inventory of the vehicles of the given make and model. The automobile dealership may receive the vehicles of the given make and model and a lower price for purchasing the vehicles in bulk. In light of this, the automobile dealer may be more flexible in negotiating the price of the vehicle on the given make and model. In another example, the automobile dealership may have certain financial goals at the end of key dates of the year (e.g., end of the quarter, end of the year, end of the fiscal year, etc.). The price of vehicles may be affected based on the time of the year in an effort for the automobile dealership to meet their respective goals. In yet another example, a vehicle may remain unsold for a large amount of days. The price of this vehicle may be affected based on an effort for the automobile dealership to sell this vehicle as soon as possible.

Figure 3:
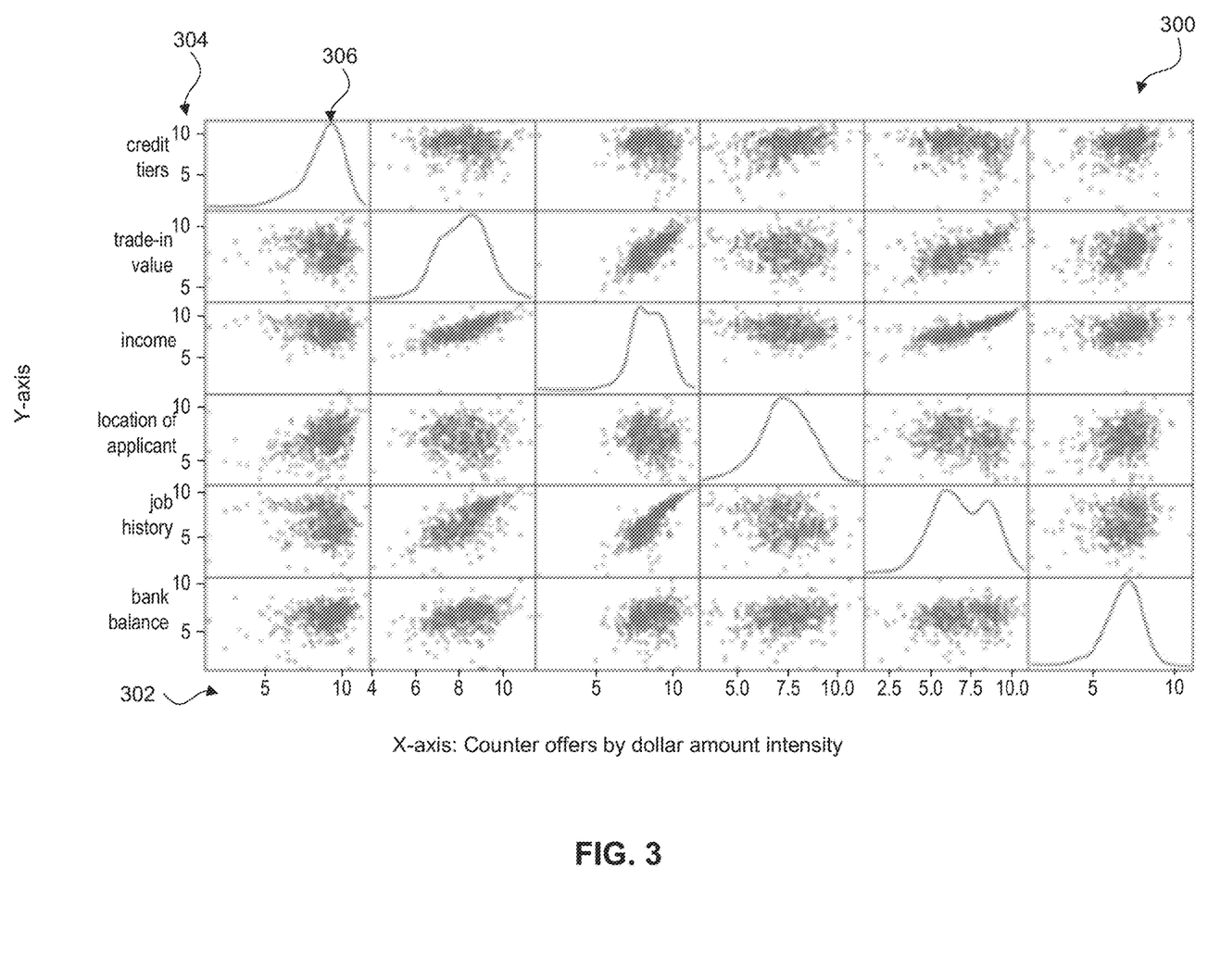
FIG. 3 is a block diagram illustrating various dimensions for the multi-dimensional graph according to some embodiments.

FIG. 3 is a graph illustrating various dimensions for the multi-dimensional graph according to some embodiments. A graph 300 may include an x-axis 302 and a y-axis 304. X-axis 302 may include different types of dimensions and values of the dimensions as they impact a final sales price or financing structure of a product for various sellers. Y-axis 304 also includes different types of dimensions and values of the dimensions as they impact a final sales price or financing structure of a product for various sellers.

As described above, dealer profile engine 106 may position clusters of sellers on a multi-dimensional graph based on the values of each of the sellers for a given attribute. The position of the seller on the multi-dimensional graph may determine a seller profile. The seller profile may indicate patterns of seller behavior in determining the final price of a product.

The x-axis 302 and y-axis 304 may represent n-dimensions of attributes that may be used to build the seller profiles. The distribution of each of the graphs may indicate how statistically reliable each of the n-dimensions of a seller profile are in determining how to characterize any given seller. For example, x-axis 302 may represent various scenarios such as counter offers by dollar amount intensity, and the y-axis 304 may represent credit tiers, income of the applicant, or the net trade-in value, and/or the like. The graphs can identify predictable patterns of seller behavior based on the x-axis 302 and y-axis 304. For example, graphs can identify predictable patterns of seller behavior in response to any given combination of product/customer/structure scenarios to identify patterns and assess the strength of those patterns.

As described above, the dealer profile engine may determine which attributes impact the determining of the sales price or final financing structure which is identified as impacting the final financing structure of sales price more than a threshold amount of occurrences and which attributes impact the sales price or final financing structure more than a threshold amount, resulting in a subset of attributes. Each attribute can correspond with a different dimension in the multi-dimensional graph.

The dealer profile engine may determine that an attribute impacts the sale price or final financing structure for more than a threshold amount of sellers by determining that the attribute changes the determination or decision structure for a given seller in determining the sale price or final financing structure. The dealer profile engine may determine that the attribute impacts the sale price or final financing structure for more than a threshold amount of sellers based on the generation of a bell curve 306 at a specified value of the attribute.

In a non-limiting example, the seller may be an automobile dealership, and a dimension may be a frequency of counteroffers presented to a buyer. The dealer profile engine may determine that the sales price or final financing structure presented by more than a threshold amount of automobile dealers was affected for automobiles over $30,000. Furthermore, the dealer profile engine may determine that the difference in sales price or final financing structure presented by the more than threshold amount of dealers varied more than a threshold amount based on their willingness to present counteroffers. As an example, automobile dealer A may have refused to present counteroffers for automobiles over $30,000, as compared to automobile dealer B, which frequently presented counter offers for automobiles over $30,000, resulting in a difference in the final sales price for the same automobile of $5,000. In the event the threshold amount is any amount more than $2,000, the dealer profile engine may determine that frequency of presenting counter offers is an impactful attribute.

As another example, a dimension may be the weather on the day of a sale. The dealer profile engine may determine that the sales price or final financing structure presented by less than a threshold amount of automobile dealers was affected by the weather. Furthermore, for those automobile dealers for which the weather did affect the sales price or final financing structure, the amount the sales price or final financing structure was less than a threshold amount. In this case, the dealer profile engine may not deem the weather the day of the sale as an impactful attribute.

Figure 4:
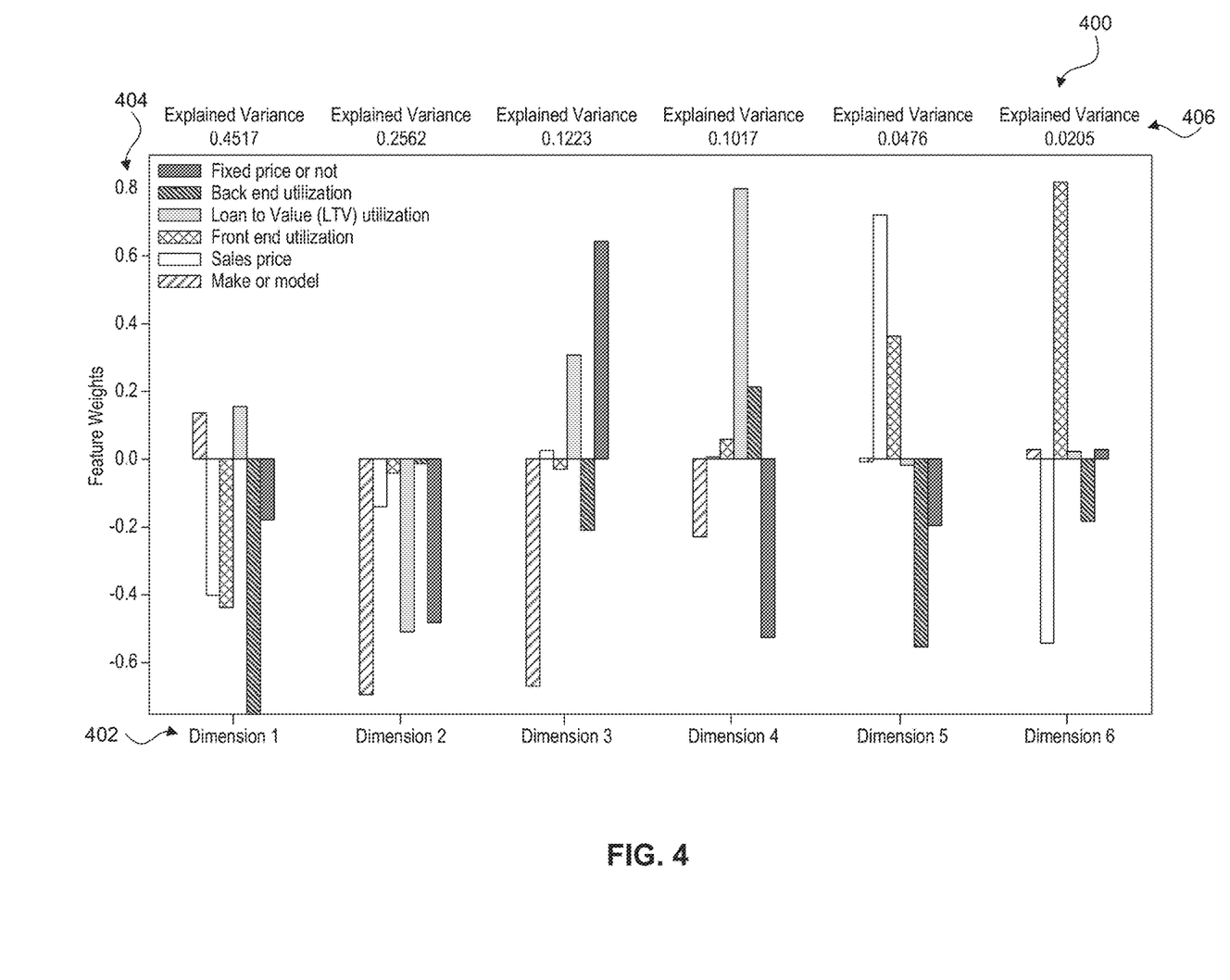
FIG. 4 is a block diagram illustrating dimensions and weights for the multi-dimensional graph according to some embodiments.

FIG. 4 is a chart 400 illustrating dimensions and weights for the multi-dimensional graph according to some embodiments. Chart 400 includes dimensions 402 along the x-axis and feature weights 404 along the y-axis. Each dimension may be assigned a different weight based on how much the dimension impacts the sales price or final financing structure of a product. The individual weights within each of the dimensions (in this example, there are six dimensions) represent different observed values for attributes such as customer income or product information. The weights may be coefficients that establish how much weight to give to each of those attributes as the system scores a particular financing structure along each dimension.

The dimensions represent the n-number of facets of differentiation (e.g., fixed price or not, Backend utilization, LTV utilization, etc.). Within each facet of differentiation, the weights individually establish scoring parameters that contribute to scoring each final price or final financing structure against an established seller profile. The values assigned for explained variance represent the delta between expected and observed outcomes. The dealer profile engine may recalibrate the weighting of attributes as it receives more data. In this way, the variances function to inform continuous improvement in the weighting of the individual attributes within each dimension such that the variance between observed and expected outcomes becomes smaller and, in-turn, more accurate, over time.

In one embodiment, if a dimension is impactful in the determination of the sales price or final financing structure of a product, then the weight for that dimension is higher. Conversely, if a dimension is not impactful in the determination of the sales price or final financing structure of a product, then the weight of the dimension is lower.

In some embodiments, one dimension can affect the impact of another dimension. For example, if the product for sale is an automobile, a first dimension is the year of the automobile, and a second dimension is the color of the automobile. The color of the automobile may matter more for determining the final sales price when the automobile is less than ten years old. Conversely, the color of the automobile may not matter as much for determining the final sales price when the automobile is more than ten years old. In this regard, the impact of the second dimension of color may vary depending on the value of the first dimension.

Figure 5:
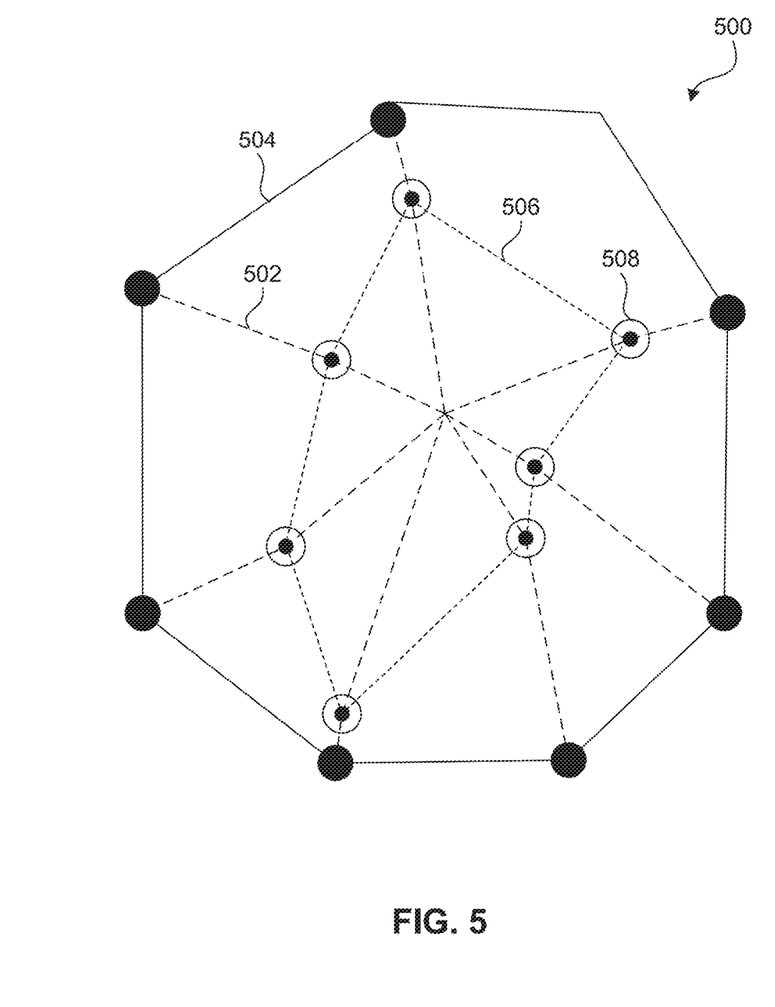
FIG. 5 illustrates a graph including nodes and edges, indicating a seller's score for different dimensions.

FIG. 5 illustrates a graph 500 including nodes and edges, indicating a seller's score for different dimensions. Graph 500 includes dimension lines 502 with maximum nodes 503 connected by edges 504. The maximum nodes 503 may indicate a maximum value for each dimension along dimension line 502. The maximum value may indicate that the dimension is the most impactful in determining a sales price or final financing structure for a product.

As described above, the dealer profile engine may determine a value for each seller for each dimension. The value may correspond to how impactful that particular dimension is for the seller in determining the sales price or final financing structure. For example, the value may indicate how much the sales price or final financing structure changes based on a given dimension.

The calculated values for the seller may be plotted on the graph 500 along dimension lines 502. The values may be represented by nodes 508. Nodes 508 may be connected by edges 506. Nodes 508 may be connected to identify values along dimension lines 502 of a single seller. The closer nodes 508 are to maximum nodes 503 along the dimension lines 502, the higher the calculated value for the seller for that particular dimension. In this regard, the higher the value (and the closer the node 508 is to maximum node 503), the more impactful that particular dimension is for determining sales price or final financing structure for a product.

Figure 6:
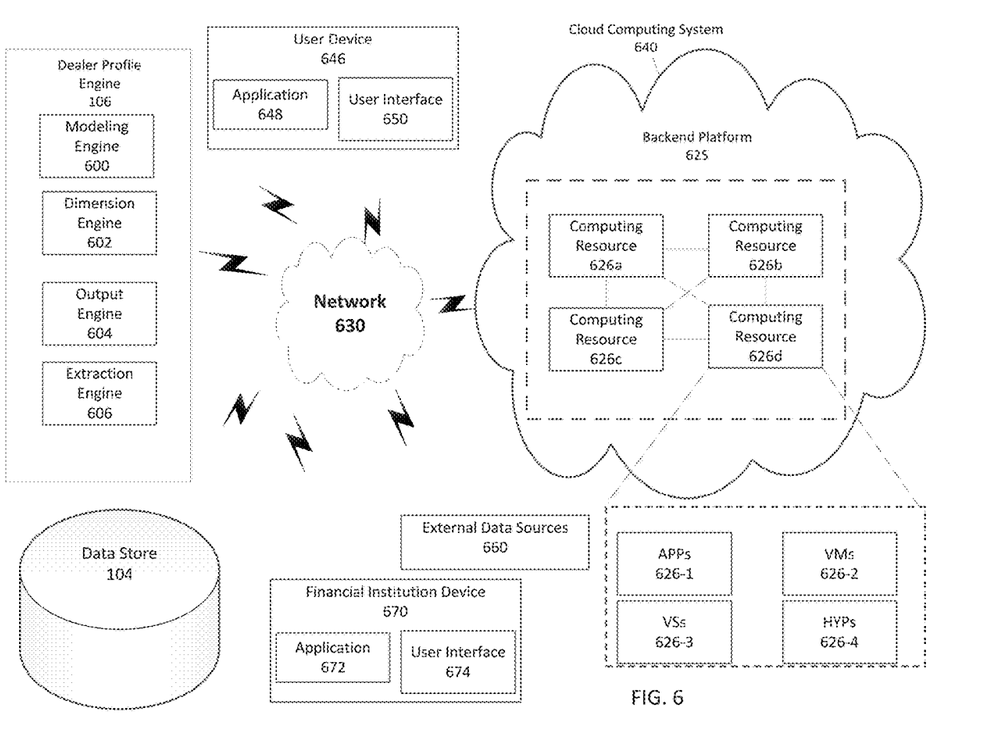
FIG. 6 illustrates an example environment in which systems and/or methods for generating financing structures are implemented according to some embodiments.

FIG. 6 illustrates an example environment in which systems and/or methods for generating financing structures are implemented according to some embodiments. The environment may include a dealer profile engine 106, a data store 104, a user device 646, external data sources 660, and a financial institution device 670. Dealer profile engine 160 may include a modeling engine 600, a dimension engine 602, an output engine 604, and an extraction engine 606. User device 646 may include an application 648 and a user interface 650. User device 646 may use application 648 to interface with dealer profile engine 106 and financial institution device 670. Financial institution device 670 may include an application 672 and a user interface 674. The application 672 may be used to interface with dealer profile engine 106 and user device 646. Dealer profile engine 106 may be embodied as a learning engine. Application 648 may interface with dealer profile engine 106 to render financing structures on user interface 650. Data store 104 may store information regarding product sales by various sellers including, the final sales price of the product, details regarding the product, financing structures presented to the customer, final financing structure accepted by the customer, contracts, and/or the like. External data sources 660 may store information such as seller data including product inventory, decision structures used by the seller to determine the sales price of a product, average sales prices provided by the seller, negotiation characteristics, and/or the like. External data sources 660 may include but are not limited to, websites, databases, data repositories, excel files, and/or the like.

The devices of the environment 600 may be connected through wired connections, wireless connections, or a combination of wired and wireless connections. Dealer profile engine 106 and data store 104 may reside inside cloud computing environment 640. Alternatively, Dealer profile engine 106 and data store 104 may reside outside cloud computing environment 640.

In an example embodiment, one or more portions of the network 630 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Backend platform 625 may include a server or a group of servers. In an embodiment, backend platform 625 may be hosted in a cloud computing environment 640. It may be appreciated that backend platform 625 may not be cloud-based, or may be partially cloud-based.

Cloud computing environment 640 may include an environment that delivers computing as a service, shared resources, services, etc. Cloud computing environment 640 may provide computation, software, data access, storage, and/or other services that do not require end-user knowledge of a physical location and configuration of a system and/or a device that delivers the services. Cloud computing system 640 may include computer resources 626.

Each computing resource 626a-d may include one or more personal computers, workstations, computers, server devices, or other types of computation and/or communication devices. Computing resource(s) 626a-d may host backend platform 625. The cloud resources may include compute instances executing in cloud computing resources 626a-d. Cloud computing resources 626a-d may communicate with other cloud computing resources 626a-d via wired connections, wireless connections, or a combination of wired or wireless connections.

Computing resources 626a-d may include a group of cloud resources, such as one or more applications ("APPs") 626-1, one or more virtual machines ("VMs") 626-2, virtualized storage ("VS") 626-3, and one or more hypervisors ("HYPs") 626-4.

Application 626-1 may include one or more software applications that may be provided to or accessed by user device 646. In an embodiment, application 648 may execute locally on user device 646. Alternatively, the application 626-1 may eliminate a need to install and execute software applications on user device 646. The application 626-1 may include software associated with backend platform 625 and/or any other software configured to be provided across the cloud computing environment 640. The application 626-1 may send/receive information from one or more other applications 626-1, via the virtual machine 626-2.

Virtual machine 626-2 may include a software implementation of a machine (e.g., a computer) that executes programs like a physical machine. Virtual machine 626-2 may be either a system virtual machine or a process virtual machine, depending upon the use and degree of correspondence to any real machine by virtual machine 626-2. A system virtual machine may provide a complete system platform that supports the execution of a complete operating system (OS). A process virtual machine may execute a single program and may support a single process. The virtual machine 626-2 may execute on behalf of a user (e.g., user device 646) and/or on behalf of one or more other backend platforms 625, and may manage the infrastructure of cloud computing environment 640, such as data management, synchronization, or long-duration data transfers.

Virtualized storage 626-3 may include one or more storage systems and/or one or more devices that use virtualization techniques within the storage systems or devices of computing resources 626a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file-level and location where files are physically stored. This may enable optimization of storage use, server consolidation, and/or performance of non-disruptive file migrations.

Hypervisor 626-4 may provide hardware virtualization techniques that allow multiple operations systems (e.g., "guest operating systems") to execute concurrently on a host computer, such as computing resources 626a-d. Hypervisor 626-4 may present a virtual operating platform to the guest operating systems and may manage the execution of the guest operating systems multiple instances of a variety of operating systems and may share virtualized hardware resources.

In an embodiment, dealer profile engine 106 may receive data from data store 104 and may extract data from external data sources 660. The dealer profile engine 106 may continuously be trained using the data from data store 104 and external data sources 660. As described above, data store 104 may store information regarding product sales by various sellers including, the final sales price of the product, details regarding the product, financing structures presented to the customer, final financing structure accepted by the customer, contracts, and/or the like. External data sources 660 may store information such as seller data including product inventory, decision structures used by the seller to determine the sales price of a product, average sales prices provided by the seller, negotiation characteristics, and/or the like.

Dimension engine 602 may identify attributes that impact the determination of a sales price or final financing structure presented to a customer for a given product. Dimension engine 602 may identify a subset of attributes from multiple different attributes that cause a change in a determination of a final price for a given product identified more than a threshold amount of occurrences and which cause a change in the determination of the final price more than a threshold amount. Dimension engine 602 may eliminate the attributes based on the data from data store 104 and external data sources 660. Dimension engine 603 may remove data received from data store 104 or external data sources 660, which pertain to the eliminated attributes. Dimension engine 602 may transform the subset of attributes into a subset of dimensions for generating a multi-dimensional graph.

Modeling engine 600 may compute a value for each seller with respect to each dimension of the subset of dimensions. The higher the value for the seller for a given dimension, this indicates the more impactful that particular dimension is in determining a sales price or final financing structure for that seller. Modeling engine 600 may group each of the sellers into different clusters. Each cluster may include a subset of sellers having a value for a given dimension within a predetermined amount of each other. Modeling engine 600 may generate a model, including the subset of dimensions. The model may be a multi-dimensional graph. The dimensions of the multi-dimensional graph may be defined by the subset of dimensions. Modeling engine 600 may position each cluster on a multi-dimensional graph based on each value of each seller in each cluster for a given dimension.

In some embodiments, a given seller of a given product may generate a pricing structure for the given product being purchased by a customer. Dealer profile engine 106 may receive a request to determine a financing structure for the given seller and product. Output engine 604 may determine a cluster, including the given seller. Output engine 604 may determine the values for each dimension for the given seller. Output engine 604 may generate a financing structure for the given seller and product based on the position of the identified cluster, including the given seller on the multi-dimensional graph and the values for each dimension for the given seller. Output engine 604 may generate a financing structure that is optimized for the customer, given the pricing structure of the product. For example, the financing structure may provide the lowest APR, optimized payment schedule, lowest monthly payment, and/or the like for the given customer, product, and pricing structure. In an embodiment, the request may include a final sales price for the product.

In another embodiment, output engine 604 may forecast a final sales price for the given product sold by the given seller based on the values for each dimension for the given seller. In an embodiment, output engine 604 may generate multiple different alternative financing structures. The financing structure may include annual percentage rate (APR), the period of the loan, amount of loan, date of origination of the loan, customer details, and/or the like.

In an embodiment, user device 646 may transmit the request for generating the financing structure using application 648. Output engine 604 may transmit the financing structure to user device 646. Application 648 may receive the financing structure and render financing structure on user interface 650.

Each time a financing structure is generated for a seller and the seller (or customer) accepts or rejects the financing structure, the data related to the financing structure is stored in the data store 104. As stated above, the dealer profile engine 106 may continuously be trained using the data in the data store.

The dealer profile engine 106 may use a machine-learning algorithm to generate financing structures for the specified product sold by the specified seller. The machine learning algorithm may be an unsupervised machine learning algorithm, such as K-means clustering.

K-means clustering is a type of unsupervised learning algorithm. The algorithm may identify groups (or clusters) in the data. The number of groups may be identified by the variable K. The algorithm works iteratively to assign each data point to one of the K groups based on the features that are provided. Using K-means clustering, the dealer profile engine 106 may attempt to group a seller into a cluster based on their values for each dimension.

As a non-limiting example, dealer profile engine 106 may be used to generate financing structures for automobile sales. Dealer profile engine 106 may receive data from data store 104 and may extract data from external data sources 60. The dealer profile engine 106 may continuously be trained using the data from data store 104 and external data sources 660. Data store 104 may store information regarding automobile sales by various dealers including, the final sales price of the automobiles, details regarding the automobiles, financing structures presented to the customer, final financing structure accepted by the customer, contracts, and/or the like. External data sources 660 may store information such as dealer data including automobile inventory, decision structures used by the seller to determine the sales price of an automobile, average sales prices provided by the automobile, negotiation characteristics, and/or the like.

Dimension engine 602 may identify attributes that impact the determination of a sales price or final financing structure presented to a customer for a given product. Dimension engine 602 may identify a subset of attributes from multiple different attributes, which cause a change in a determination of a final price for a given product for more than a threshold amount of sellers and which causes a change in the determination of the final price more than a threshold amount.

Dimension engine 602 may eliminate the attributes based on the data from data store 104 and external data sources 660.

As an example, a dealer may factor in automobile make and model, year, color, condition, time of the month, inventory, demand, fuel type, and/or the like in determining a sales price for the automobile. Moreover, certain dealers may be willing to negotiate more than others. Some dealers may be willing to negotiate on the total value of the automobile by increasing the backend value of services. For example, backend services may include extended warranties and service of the vehicle. Some dealers may reduce the total value of the automobile by adding in the backend value to the final sales price. In this regard, an attribute may include a percentage of backend value and/or front end value of the sales price. Out of all of these attributes, some attributes may affect or change the sales prices more than a threshold amount as compared to the other attributes. Additionally, some attributes may affect or change the sales price for more than a threshold amount of dealers. Dimension engine 601 may transform the subset of attributes into a subset of dimensions for generating a multi-dimensional graph.

Modeling engine 600 may compute a value for each dealer with respect to each dimension of the subset of dimensions. The higher the value for the seller for a given dimension, this indicates the more impactful that particular dimension is in determining a sales price or final financing structure for that seller. For example, the sales price for a given automobile may change more based on a dimension related to the percentage of backend value in the sales price for a first and second dealer as compared to a third and fourth dealer. Therefore, the value for that particular dimension may be higher for the first and second dealer as compared to the value for that particular dimension for the third and fourth dealer.

Modeling engine 600 may group each of the dealers into different clusters. Each cluster may include a subset of dealers having a value for a given dimension within a predetermined amount of each other. Based on the above example, the first and second dealers may be grouped in a first cluster, and the third and fourth dealer may be grouped in a second cluster. Modeling engine 600 may generate a model, including the subset of dimensions. The model may be a multi-dimensional graph. The dimensions of the multi-dimensional graph may be defined by the subset of dimensions. Modeling engine 600 may position each cluster on a multi-dimensional graph based on each value of each dealer in each cluster for a given dimension.

Modeling engine 600 may use the clusters to define dimensions of the multi-dimensional graph. For example, the modeling engine 600 may identify aggregate practices across all platforms. Modeling engine 600 may determine dimensions which are more relevant/important to a given cluster based on its position on the multi-dimensional graph. Modeling engine 600 may use the relevant/important dimensions for the given cluster to generate a multi-dimensional graph for finalized sales and financing structures for a given dealer. Modeling engine 600 may determine values for attributes associated with the relevant/important dimensions for each finalized sale or financing structure for the given dealer. Modeling engine 600 may group each finalized sale or financing structure in a cluster based on the values for the attributes for each finalized sale or financing structure.

In some embodiments, dealer profile engine 106 may receive a request to determine a financing structure for a given dealer and automobile. Output engine 604 may determine the values of attributes for the requested financing structure based on the information provided in the request. Output engine 604 may determine a cluster of finalized financing structures that closely matches the values of attributes for the requested financing structure. Output engine 604 may generate a financing structure for the given dealer and automobile based on the identified cluster of finalized financing structures. The financing structure may be optimized for the customer based on the customer's preferences and based on a likelihood of the dealer agreeing to the finalized financing structures (e.g., based on the dealer's profile). For example, the customer may choose to purchase an extended warranty with the automobile. The output engine 604 will generate a financing structure that includes financing for the extended warranty in the pricing structure. This way, the dealer and customer are presented with financing structures that are specifically geared to the automobile being purchased, given the pricing structure of the automobile.

In an embodiment, the user device 646 may be operated by the dealer. The dealer may transmit the request for generating the financing structure to the dealer profile engine 106, using application 648. Output engine 604 may transmit the financing structure to user device 646. Application 648 may receive the financing structure and render financing structure on user interface 650.

In an embodiment, the dealer may transmit a request for generating a set of financing structures for a given automobile to the financial institution device 670 using application 648. Application 672 may receive the request. Application 672 may interface with the dealer profile engine 106 to generate the set of financing structures. Application 672 may receive the set of financing structures and transmit the set of financing structures to the user device 646. Application 648 may receive the set of financing structures and render the set of financing structures on the user interface 650.

In an embodiment, the dealer may transmit a request for generating a financing structure for a given automobile (or a plurality of automobiles) to the financial institution device 670 using the application 648. Application 672 may receive the request. Application 672 may interface with the dealer profile engine 106 to generate the financing structure for the given automobile or automobiles. Application 672 may receive the financing structure and transmit the financing structure to the user device 646. Application 648 may receive the financing structure and render the financing structure on the user interface 650.

The financial institution may reject a specific financing structure for any given automobile and customer. The dealer may only allow for a single counteroffer to the specific financing structure. Application 672 may transmit a request for generating a counter offer financing structure to the dealer profile engine 106. The dealer profile engine 106 may identify and generate a counteroffer financing structure that best fits the dealer's tendencies and requirements, as described above. Application 672 may receive the counter offer financing structure and transmit the financing structure to the user device 646. Application 648 may receive the counter offer financing structure and render the counter offer financing structure on the user interface 650. In an embodiment, dealer profile engine 106 may generate multiple different counteroffer financing structures and select the one that best fits the particular dealer.

Each time a financing structure is generated for the seller (or customer) and the seller (or customer) accepts or rejects the financing structure, the data related to the financing structure is stored in the data store 104. As stated above, the dealer profile engine 106 may continuously be trained using the data in the data store 104. For example, the dealer profile engine 106 may identify attributes associated with the dealer's determination of the final price based on the new data that is collected, which may change the dealer's values with respect to one or more dimensions. In this regard, the dealer profile engine 106 is in near real-time or at least periodically (e.g., daily, hourly, weekly, monthly, etc.) being optimized based on new data collected to generate accurate financing structure geared to effectively moving the parties to agreement on the financing structure enabling the product to be purchased given the pricing structure of the product.

Figure 7:
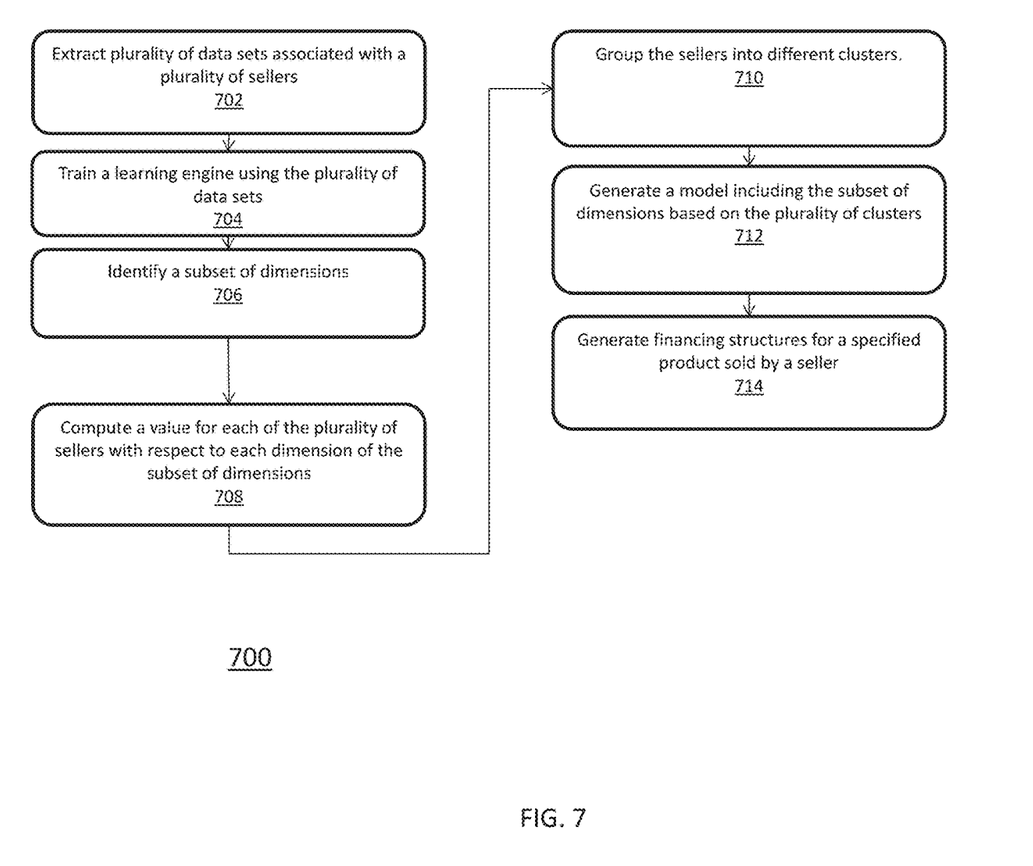
FIG. 7 is a flowchart illustrating a process for authorizing secondary users to access a primary user's account, according to some embodiments.

FIG. 7 is a flowchart illustrating a process for generating financing structures, according to some embodiments. It is to be appreciated the operations may occur in a different order, and some operations may not be performed.

Flowchart 700 starts at operation 702. In operation 702, an extraction engine may extract data sets associated with sellers. Each data set may be associated with a dimension used for generating a financing structure. The extraction engine may receive data from a data store or may extract data from external data sources.

In operation 704, a dealer profile engine may be trained using the data sets. The dealer profile engine may be trained to identify a subset of dimensions using a dimension engine, generate a multi-dimensional graph using a modeling engine, and generate and output financial structures using the output engine. The dealer profile engine is continuously trained using the plurality of data sets.

In operation 706, the modeling engine may identify a subset of dimensions that the plurality of sellers use in a determination of a final price for a given product for more than a threshold amount of occurrences.

In operation 708, the modeling engine may compute a value for each of the plurality of sellers with respect to each dimension of the subset of dimensions.

In operation 710, the modeling engine may group the sellers into different clusters. Each cluster including a subset of sellers having a value for a given dimension within a predetermined amount of each other.

In operation 712, the modeling engine may generate a model including the subset of dimensions based on the plurality of clusters. The model may be a multi-dimensional graph. The modeling engine may position the clusters along each of the subsets of dimensions on a graph, based on each value for a given dimension of each of the sellers in a cluster.

In operation 714, the output engine may generate financing structures for a specified product sold by a seller based on the generated model and a final price of the specified product set by the seller. The output engine may generate the financing structure for a seller by determining the position of a cluster, including the seller along each of the subset of dimensions. The output engine may receive a request for generating the financing structures based on a request received from a user device or a financial institution device.

Figure 8:
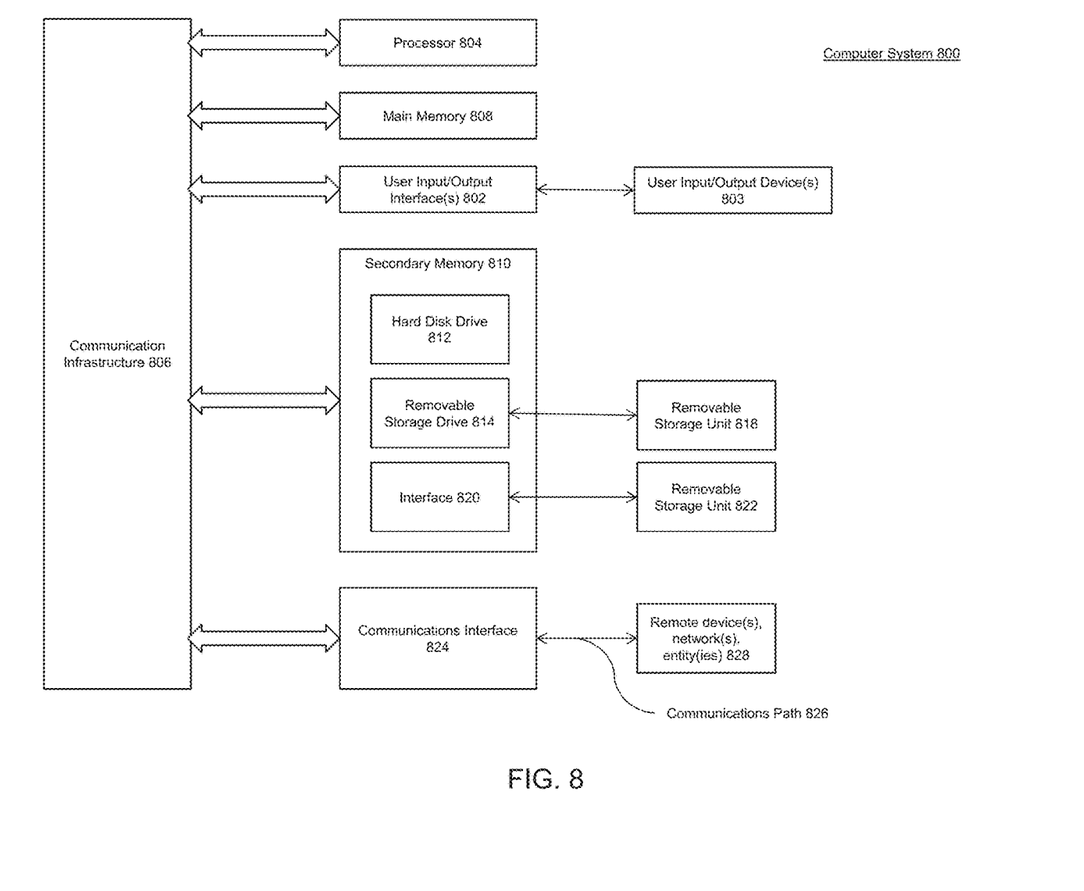
FIG. 8 is a block diagram of example components of a device, according to some embodiments.

FIG. 8 is a block diagram of example components of device 600. One or more computer systems 800 may be used, for example, to implement any of the embodiments discussed herein, as well as combinations and sub-combinations thereof. Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814.

Removable storage drive 814 may interact with a removable storage unit 818. Removable storage unit 818 may include a computer-usable or readable storage device having stored thereon computer software (control logic) and/or data. Removable storage unit 818 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities, or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A computer implemented method for increasing accuracy of weighing a plurality of attributes in a decision model, and revealing which dimension is most impactful in the decision model, the computer implemented method comprising:
   concurrently executing, by a plurality of hypervisors, multiple instances of a plurality of operating systems to provide hardware virtualization;
   performing block virtualization, by a virtualized storage component of the hardware virtualization, that separates logical storage from physical storage to allow attributes of a data store to be accessed without regard to a heterogeneous structure;
   receiving, at a profile engine, the attributes accessed from the data store;
   performing file virtualization, using a virtualized storage component of the hardware virtualization, to eliminate dependencies between the accessed attributes at a file-level and a location where files are physically stored;
   generating, by the profile engine, a multi-dimensional graph of a plurality of n-dimensions where each dimension of the n-dimensions corresponds with a respective attribute of the attributes;
   generating, by the profile engine, a bell curve along the n-dimensions of the multi-dimensional graph;
   determining, by the profile engine, which ones of the attributes impact the decision model more than a threshold amount according to a comparison of the attributes against the generated bell curve at a specified value for each of the attributes;
   identifying, by unsupervised machine learning, clusters of variable K to each of the attributes processed by K-means clustering that assigns each of the clusters to each of a plurality of K groups based on feature weights;
   positioning, by the profile engine on the multi-dimensional graph, the identified clusters, along a first axis comprising the n-dimensions and, along a second axis representing the feature weights, based on how much weight to give to each of the attributes along each of the n-dimensions;
   computing, by the profile engine, a distribution of each graph of the multi-dimensional graph along the first and second axes indicating how statistically reliable each of the n-dimensions are in determining predictable patterns of characterization for each of the identified clusters in response to respective combinations of the n-dimensions;
   recalibrating, by the profile engine, the feature weights of the attributes for the decision model, as the profile engine receives more data for the attributes according to a continuous decrease in variance between observed and expected outcomes of the decision model to improve accuracy over time of the weighing of each of the attributes within each of the n-dimensions; and
   generating, by the profile engine, along dimension lines of the multi-dimensional graph, a plurality of maximum nodes connected to a plurality of edges of a maximum value for each dimension of the n-dimensions along the dimension lines, indicating which particular dimension of the n-dimensions is most impactful in the decision model, according to said particular dimension having a higher value of its node up to the maximum nodes.

2. The computer implemented method of claim 1, wherein the decision model corresponds to generating a financing structure.

3. The computer implemented method of claim 1, where the attributes include: a final sale price of a specified product, a breakdown of a sale price, an amount of down payment being provided, condition of the specified product, whether the specified product is new or used, and a type of the specified product.

4. The computer implemented method of claim 1, wherein the n-dimensions include: a percentage of backend value as compared to a total price of a specified product, frequency of counteroffers presented by sellers, weather on a day of a sale, an age of the specified product, and a color of the specific product.

5. The computer implemented method of claim 1, wherein the profile engine is a dealer profile engine.

6. A system for increasing accuracy of weighing a plurality of attributes in a decision model, and revealing which dimension is most impactful in the decision model, the system comprising:
a memory storing instructions;
a processor in communication with the memory to execute the instructions to allow:
concurrently executing, by a plurality of hypervisors, multiple instances of a plurality of operating systems to provide hardware virtualization;
performing block virtualization, by a virtualized storage component of the hardware virtualization, that separates logical storage from physical storage to allow attributes of a data store to be accessed without regard to a heterogeneous structure;
receiving, at a profile engine, the attributes accessed from the data store;
performing file virtualization, using a virtualized storage component of the hardware virtualization, to eliminate dependencies between the accessed attributes at a file-level and a location where files are physically stored;
generating, by the profile engine, a multi-dimensional graph of a plurality of n-dimensions where each dimension of the n-dimensions corresponds with a respective attribute of the attributes;
generating, by the profile engine, a bell curve along the n-dimensions of the multi-dimensional graph;
determining, by the profile engine, which ones of the attributes impact the decision model more than a threshold amount according to a comparison of the attributes against the generated bell curve at a specified value for each of the attributes;
identifying, by unsupervised machine learning, clusters of variable K to each of the attributes processed by K-means clustering that assigns each of the clusters to each of a plurality of K groups based on feature weights;
positioning, by the profile engine on the multi-dimensional graph, the identified clusters, along a first axis comprising the n-dimensions and, along a second axis representing the feature weights, based on how much weight to give to each of the attributes along each of the n-dimensions;
computing, by the profile engine, a distribution of each graph of the multi-dimensional graph along the first and second axes indicating how statistically reliable each of the n-dimensions are in determining predictable patterns of characterization for each of the identified clusters in response to respective combinations of the n-dimensions;
recalibrating, by the profile engine, the feature weights of the attributes for the decision model, as the profile engine receives more data for the attributes according to a continuous decrease in variance between observed and expected outcomes of the decision model to improve accuracy over time of the weighing of each of the attributes within each of the n-dimensions; and
generating, by the profile engine, along dimension lines of the multi-dimensional graph, a plurality of maximum nodes connected to a plurality of edges of a maximum value for each dimension of the n-dimensions along the dimension lines, indicating which particular dimension of the n-dimensions is most impactful in the decision model, according to said particular dimension having a higher value of its node up to the maximum nodes.

7. The system of claim 6, wherein the decision model corresponds to generating a financing structure.

8. The system of claim 6, where the attributes include: a final sale price of a specified product, a breakdown of a sale price, an amount of down payment being provided, condition of the specified product, whether the specified product is new or used, and a type of the specified product.

9. The system of claim 6, wherein the n-dimensions include: a percentage of backend value as compared to a total price of a specified product, frequency of counteroffers presented by sellers, weather on a day of a sale, an age of the specified product, and a color of the specific product.

10. The system of claim 6, wherein the profile engine is a dealer profile engine.

11. A non-transitory computer-readable medium storing instructions that when executed by one or more processors allow:
concurrently executing, by a plurality of hypervisors, multiple instances of a plurality of operating systems to provide hardware virtualization;
performing block virtualization, by a virtualized storage component of the hardware virtualization, that separates logical storage from physical storage to allow attributes of a data store to be accessed without regard to a heterogeneous structure;
receiving, at a profile engine, the attributes accessed from the data store;
performing file virtualization, using a virtualized storage component of the hardware virtualization, to eliminate dependencies between the accessed attributes at a file-level and a location where files are physically stored;
generating, by the profile engine, a multi-dimensional graph of a plurality of n-dimensions where each dimension of the n-dimensions corresponds with a respective attribute of the attributes;
generating, by the profile engine, a bell curve along the n-dimensions of the multi-dimensional graph;
determining, by the profile engine, which ones of the attributes impact a decision model more than a threshold amount according to a comparison of the attributes against the generated bell curve at a specified value for each of the attributes;
identifying, by unsupervised machine learning, clusters of variable K to each of the attributes processed by K-means clustering that assigns each of the clusters to each of a plurality of K groups based on feature weights;
positioning, by the profile engine on the multi-dimensional graph, the identified clusters, along a first axis comprising the n-dimensions and, along a second axis representing the feature weights, based on how much weight to give to each of the attributes along each of the n-dimensions;

computing, by the profile engine, a distribution of each graph of the multi-dimensional graph along the first and second axes indicating how statistically reliable each of the n-dimensions are in determining predictable patterns of characterization for each of the identified clusters in response to respective combinations of the n-dimensions;

recalibrating, by the profile engine, the feature weights of the attributes for the decision model, as the profile engine receives more data for the attributes according to a continuous decrease in variance between observed and expected outcomes of the decision model to improve accuracy over time of weighing of each of the attributes within each of the n-dimensions; and generating, by the profile engine, along dimension lines of the multi-dimensional graph, a plurality of maximum nodes connected to a plurality of edges of a maximum value for each dimension of the n-dimensions along the dimension lines, indicating which particular dimension of the n-dimensions is most impactful in the decision model, according to said particular dimension having a higher value of its node up to the maximum nodes.

12. The non-transitory computer-readable medium of claim 11, wherein the decision model corresponds to generating a financing structure.

13. The non-transitory computer-readable medium of claim 11, where the attributes include: a final sale price of a specified product, a breakdown of a sale price, an amount of down payment being provided, condition of the specified product, whether the specified product is new or used, and a type of the specified product.

14. The non-transitory computer-readable medium of claim 11, wherein the n-dimensions include: a percentage of backend value as compared to a total price of a specified product, frequency of counteroffers presented by sellers, weather on a day of a sale, an age of the specified product, and a color of the specific product.

15. The non-transitory computer-readable medium of claim 11, wherein the profile engine is a dealer profile engine.

* * * * *